United States Patent
Maricevic et al.

(10) Patent No.: US 9,917,648 B2
(45) Date of Patent: Mar. 13, 2018

(54) UPSTREAM INTERFERENCE ELIMINATING TRANSMISSION OF DIGITAL BASEBAND SIGNAL IN AN OPTICAL NETWORK

(71) Applicant: ARRIS Enterprises, Inc., Suwanee, GA (US)

(72) Inventors: Zoran Maricevic, West Hartford, CT (US); Dean Stoneback, Harleysville, PA (US); Marcel F. Schemmann, Maria Hoop (NL); Amarildo Vieira, Philadelphia, PA (US); Venkatesh G. Mutalik, Middletown, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 118 days.

(21) Appl. No.: 14/503,813

(22) Filed: Oct. 1, 2014

(65) Prior Publication Data
US 2016/0099778 A1    Apr. 7, 2016

(51) Int. Cl.
*H04J 14/00* (2006.01)
*H04B 10/27* (2013.01)
*H04B 10/2575* (2013.01)

(52) U.S. Cl.
CPC ................ *H04B 10/2575* (2013.01)

(58) Field of Classification Search
CPC .................................................. H04B 10/2575
(Continued)

(56) References Cited

U.S. PATENT DOCUMENTS 5,864,748 A * 1/1999 Dail .................. H04N 7/17309
725/126
6,490,727 B1 * 12/2002 Nazarathy ........... H04J 14/0226
725/127
(Continued)

FOREIGN PATENT DOCUMENTS

EP    1011215 A2    6/2000
EP    2661010 A1    11/2013

OTHER PUBLICATIONS

Jang et al, A bidirectional RSOA based WDM PON utilizing a SCM signal for down link and a baseband signal for up link, Mar. 2007, OFC/NFOEC, pp. 1-3.*
(Continued)

Primary Examiner — Ken N Vanderpuye
Assistant Examiner — Dibson Sanchez
(74) Attorney, Agent, or Firm — Lori Anne D. Swanson

(57) ABSTRACT

Particular embodiments provide a method for delivering data in the upstream direction without the need for upstream radio frequency (RF) modulation. For example, in some embodiments, an optical network may reach to a gateway associated with a user device. The gateway may receive digital baseband data from the user device in the upstream direction. The gateway can then send the digital baseband data through the optical network without modulating the digital baseband signal via radio frequency. At the headend, because no modulation is performed in the upstream direction, there is no need for de-modulation in the headend. In one embodiment, a scheduler-based approach is used to avoid instances of optical beat interference in the upstream direction as only one upstream device that may interfere with other devices may be able to send data at one time.

18 Claims, 11 Drawing Sheets

(58) Field of Classification Search
USPC .................................. 398/115, 58–64, 66–73
See application file for complete search history.

(56) References Cited

U.S. PATENT DOCUMENTS

| | | | |
|---|---|---|---|
| 6,763,193 B1 | 7/2004 | Chand et al. | |
| 7,088,921 B1* | 8/2006 | Wood | H04J 14/0226 398/67 |
| 7,209,442 B1* | 4/2007 | Chapman | H04L 45/28 370/229 |
| 8,396,369 B1* | 3/2013 | Farmer | H04B 10/25754 398/115 |
| 2002/0163705 A1* | 11/2002 | Bakker | H01S 5/0265 359/239 |
| 2003/0156567 A1* | 8/2003 | Oak | G06K 15/00 370/338 |
| 2003/0161637 A1* | 8/2003 | Yamamoto | H04J 14/025 398/167.5 |
| 2004/0136390 A1* | 7/2004 | Kim | H04L 29/06 370/412 |
| 2004/0264974 A1* | 12/2004 | Sorenson | H04N 7/22 398/140 |
| 2005/0025485 A1* | 2/2005 | Lee | H04H 20/69 398/71 |
| 2005/0086389 A1* | 4/2005 | Chang | H04W 88/02 709/250 |
| 2006/0094364 A1* | 5/2006 | Hirota | H04B 15/02 455/66.1 |
| 2007/0053311 A1* | 3/2007 | Kim | H04W 88/085 370/280 |
| 2007/0133987 A1* | 6/2007 | Xu | H04B 10/40 398/67 |
| 2008/0124083 A1* | 5/2008 | Esser | H04J 14/0226 398/68 |
| 2008/0139152 A1* | 6/2008 | Kang | H03G 3/3052 455/234.1 |
| 2008/0240722 A1* | 10/2008 | Karaki | H04B 10/11 398/115 |
| 2008/0292312 A1* | 11/2008 | Oron | H04B 10/0795 398/33 |
| 2008/0310842 A1* | 12/2008 | Skrobko | H04B 10/25753 398/72 |
| 2009/0148160 A1* | 6/2009 | Lim | H04B 10/25751 398/43 |
| 2009/0310615 A1* | 12/2009 | Bernard | H04L 41/0893 370/401 |
| 2010/0083330 A1* | 4/2010 | Bernstein | H04N 7/17309 398/66 |
| 2010/0150557 A1* | 6/2010 | Mysore | H04J 14/0226 398/68 |
| 2010/0226304 A1* | 9/2010 | Shoji | H04B 1/40 370/315 |
| 2012/0106963 A1* | 5/2012 | Huang | H04Q 11/0067 398/66 |
| 2012/0106964 A1* | 5/2012 | Sniezko | H04B 10/25751 398/67 |
| 2012/0198510 A1 | 8/2012 | Stoneback et al. | |
| 2012/0275792 A1* | 11/2012 | Nandiraju | H04L 12/2801 398/66 |
| 2013/0125194 A1* | 5/2013 | Finkelstein | H04L 12/2801 725/129 |
| 2013/0230328 A1* | 9/2013 | Fan | H04B 10/25759 398/115 |
| 2014/0105604 A1* | 4/2014 | Luo | H04L 25/085 398/98 |
| 2014/0233955 A1 | 8/2014 | Gadkari et al. | |

OTHER PUBLICATIONS

Lim et al, Fiber Wireless Networks and Subsystem Technologies, Feb. 2010, Journal of Lightwave Technology, vol. 28, No. 4, pp. 390-405.*

Chand, Naresh et al, "Delivery of Digital Video and Other Multimedia Services (>1 Gb/s Bandwidth) in Passband above the 155 Mb/s Baseband Services on a FTTx Full Service Access Network", IEEE JLT vol. 17, No. 12, Dec. 1999, pp. 2449-2460.

PCT Search Report & Written Opinion, RE: Application No. PCT/US2015/050187, dated Jan. 8, 2016.

* cited by examiner

UPSTREAM INTERFERENCE ELIMINATING TRANSMISSION OF DIGITAL BASEBAND SIGNAL IN AN OPTICAL NETWORK

BACKGROUND

Several network types exist for delivering media content, such as video, data, voice, or high-speed Internet services to subscribers. In a cable television (CATV) network, for example, the network may take the form of an all-coax, all-fiber, or hybrid fiber/coax (HFC) network, delivering media content from a headend to subscriber client devices. In addition to transporting data traffic, as well as television content signals over a CATV network, multiple services operators (MSO) also use their network infrastructure for carrying voice, video on demand (VoD) and video conferencing traffic signals, among other types.

Radio Frequency (RF) over Glass (RFoG) is a fiber to the premise (FTTP) technology that may operate concurrently with an HFC network, such as out of the same headend/hub in a cable network. Premise may include a home, business, or other location. RFoG permits the continued use of traditional HFC equipment and back-office applications with fiber-to-the-premise deployments. For example, RFoG enables cable operators to reuse existing headend equipment and infrastructure of Data Over Cable Service Interface Specification (DOCSIS) service delivery. Thus, use of existing cable modem termination system (CMTS) platforms, headend equipment, set-top boxes, and cable modems can continue while gaining benefits inherent with RFoG systems. For example, concurrent RFoG/HFC operation enables the use of RFoG for node splitting, which may increase capacity in an existing HFC network.

Communications downstream (or forward) may be straightforward in that the downstream communications are sent to all receivers, but only the intended receivers decode or utilize the data. However, communication in the upstream (or return) direction may be prone to interference. For example, a phenomenon called optical beat interference (OBI) may occur in RFoG systems when the signals from two return transmitters hit a receiver simultaneously on the same wavelength, or when the wavelength separation is small (e.g., <200 pm). In a cable system, for example, the condition that causes OBI can easily occur in multiple-dwelling unit (MDU) applications of DOCSIS-based systems with bonded upstream channels. OBI can potentially impact the entire return path performance and will become an increasing concern as return path bandwidth and utilization grows.

Methods to prevent the interference have been proposed, such as scheduler-based and physical layer (PHY)-based solutions. The scheduler-based and physical layer (PHY)-based solutions organize the upstream transmissions in a way that only one of the offending upstream devices sends data at one time to any particular optical receiver. In the physical-layer solution, even if two offending upstream devices can send data at the same time (as would be the case with bonded D3.0 channels), other precautions are taken such that no two upstream devices emit optical signals at precisely the same optical wavelengths. Using the scheduler-based approach, upstream and downstream solutions for communicating data may be provided without experiencing interference.

DETAILED DESCRIPTION

Described herein are techniques for a system for sending digital baseband data upstream without radio frequency (RF) modulation. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a method for delivering data in the upstream (e.g., return) direction without the need for upstream radio frequency (RF) modulation. For example, in some embodiments, an optical distribution network (e.g., optical fiber) may reach to a gateway associated with a user device, such as a set-top box. The gateway may receive digital baseband data from the user device 220 in the upstream direction. The gateway can then send the digital baseband data through the optical network without modulating the digital baseband signal via RF. That is, the digital baseband data remains in its native baseband on/off digital domain when sent through the optical network. At the headend, because no modulation is performed in the upstream direction, there is no need for de-modulation in the headend. In one embodiment, a scheduler-based approach is used to avoid instances of optical beat interference in the upstream direction as only one upstream device that may interfere with other devices may be able to send data at one time. Also, in one embodiment, the downstream direction may be sent using RF modulation or no modulation.

Figure 1:
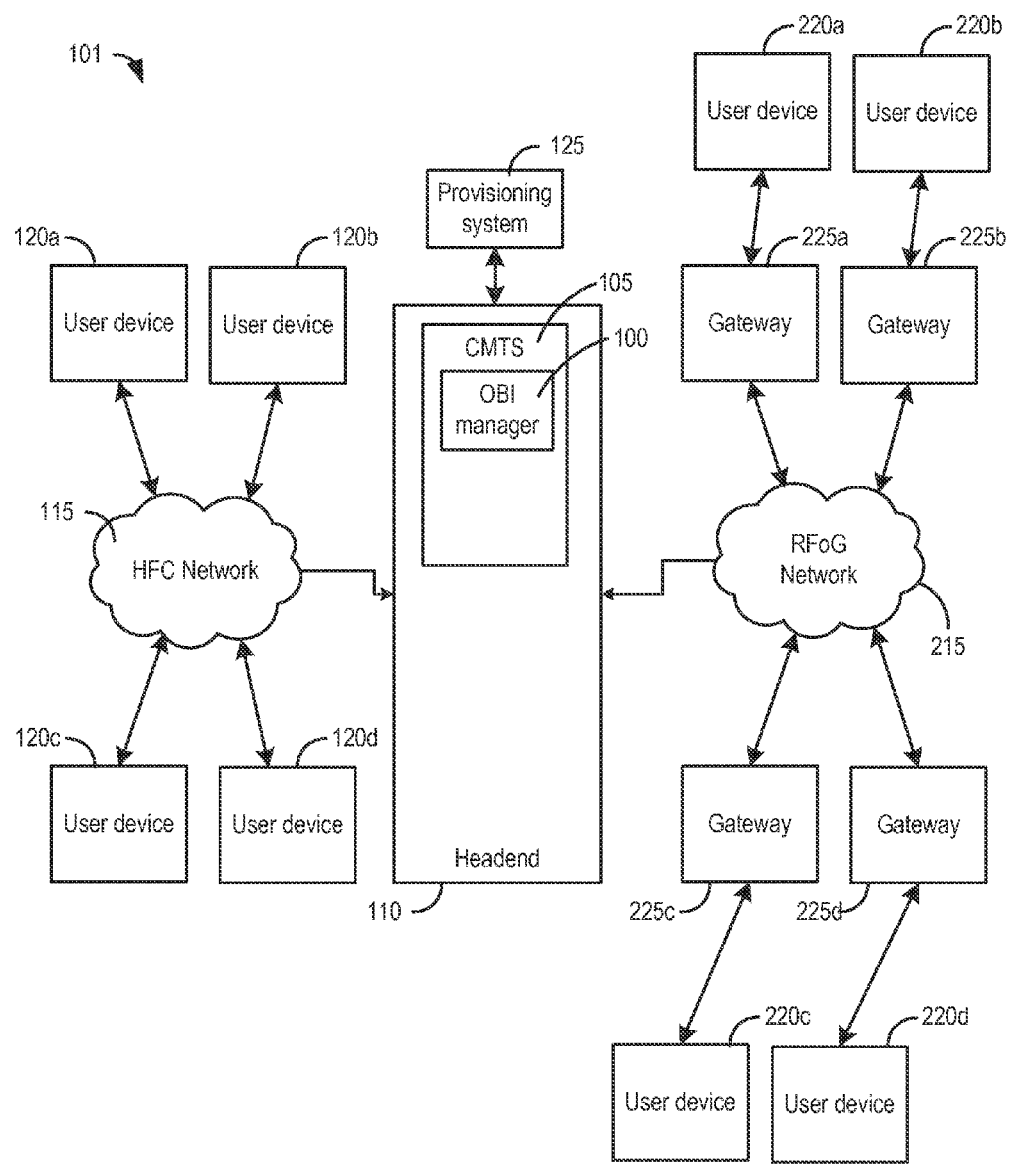
FIG. 1 depicts a system for sending data in the upstream direction without modulation according to one embodiment.

FIG. 1 depicts a system 101 for sending data in the upstream direction without modulation according to one embodiment. System 101 is an illustration of an example radio frequency over glass (RFoG) network 215 that is deployed with an existing Hybrid Fiber-Coaxial (HFC) network 115. Although this network is described, other networks may be used. System 101 can include a cable modem termination system (CMTS) 105 located at a headend 110 of a multiple service operator (MSO), such as a cable company. As described in more detail below, CMTS 105 can be used to serve customers on a Hybrid Fiber-Coaxial (HFC) broadband network, a Radio Frequency over Glass (RFoG) broadband network, or a mixed HFC and RFoG network. One or more user devices 120a-d (e.g., cable modems, embedded media terminal adapters (EMTAs—also known as cable telephony modems, or set-top boxes) can communicate with the CMTS 105 through HFC network 115. It should be understood that only four user devices 120a-d are shown (for illustrative purposes), but more may be deployed.

CMTS 105 is typically provided at a headend 110 or hub site of a broadband network for providing high speed data services such as Internet, Voice over Internet Protocol, or digital video services to subscribers of a cable TV operator or to like customers. CMTS 105 hosts downstream and upstream ports and contains numerous receivers, each receiver handling communications between hundreds of end user devices (e.g., network elements) connected to the broadband network. Examples of network elements include cable modems, set top boxes, televisions equipped with set top boxes, gateways, Data Over Cable Service Interface Specification (DOCSIS) terminal devices, media terminal adapters (MTA), EMTAs, and the like.

In some implementations, headend 110 can provide video, data and voice service to a subscriber. CMTS 105 can include a processor, a memory, and a storage device. It may also have one or more transmitters/receivers (not shown) for transmitting signals through one or more networks, including the HFC network 115, to one or more user devices 120a-d. The transmitters/receivers can be one or more separate transmitter and receiver components residing on the same board, or separate boards; further, the transmitter and receiver can also include various sub-components, such as modulators and demodulators. CMTS 105 can also receive data signals from user devices, such as cable modems 120a-d, EMTAs, and/or set top boxes, through one or more networks, including the HFC network 115.

An RFoG topology may include an all-fiber service from the headend 110 to a field node, or optical network unit (ONU) (not shown), which is typically located at or near a user's premises. However, in other embodiments, RFoG network 215 may provide optical fiber to a gateway 225. A gateway 225 may be a networking device that may be associated with a user device 220. Although gateway 225 is shown as being separate from user device 220, it will be understood that user device 220 may be integrated with gateway 225. In one embodiment, gateway 225 may be located closer to the premise than an ONU. That is, gateway 225 may be associated with a premise (e.g., a location, home, business) that includes a user device 220. By way of example, gateways 225 can be located at a single home, a business, a multi-tenant dwelling (MTU/MDU) or an individual living unit within an MTU. Also, gateway 225 may be associated with any number of user devices 220 found within the premise. Although the RFoG network is described, other optical networks may be used.

In one example, gateways 225 may embody functionality previously performed by the optical networking units (ONUs) in RFoG network 215. In this case, gateways 225 terminate the fiber connection at a subscriber-side interface and convert traffic for delivery over the in-home network at the customer premises. Coaxial cable or a wireless network can be used to connect gateways 225 to one or more user devices 220a-d, where the RFoG user devices 220a-d can include cable modems, EMTAs, or set-top boxes, as with the user devices of an HFC network. In one example, user devices 220 may include multiple devices, such as a cable modem, and customer premise equipment (CPE), such as a set-top box, IP phone, IP video device, etc. For example, gateways 225 may connect to set-top boxes, cable modems, and/or similar network elements via coaxial cable, and one or more of the cable modems may connect to the subscriber's internal telephone wiring and/or to personal computers or like devices via Ethernet or Wi-Fi connections.

In the downstream direction, in the headend, a downstream laser sends a broadcast signal that is optically split multiple times. The optical network unit (if used), or ONU, recovers the RF broadcast signal and passes it into the subscriber's coax network in the downstream direction.

Upstream transmissions from the user devices 220a-d can pass through gateways 225, the RFoG network 215, and be received by an RFoG transmitter/receiver at headend 110. In various implementations, the RFoG transmitter/receiver may be one or more separate transmitter and receiver components residing on the same board, or alternatively separate boards. The RFoG transmitter/receiver may also be integrated with CMTS 105.

For example, the return path for voice, data, video, and other upstream traffic from a user device 220 is through gateways 225, which converts the upstream signal to an optical upstream signal and transmits the optical upstream signal to the return path RFoG optical receiver at headend 110 or hub. The RFoG optical receiver converts the upstream optical signal at headend 110 to an RF electrical signal for CMTS 105. As will be discussed in more detail below, the RFoG transmitter/receiver receives unmodulated digital baseband signals on optical channels and does not need to demodulate the signals, but converts the signals into the electrical signals, which may be RF signals. Signals from the RFoG network 215 may then be combined with one or more RF signals coming from other HFC networks such as HFC network 115, or from other RFoG networks using an RF combiner (not shown), before being received by the CMTS transmitter/receiver (not shown).

Accordingly, gateways 225 convert optical signals from headend 110 into electrical signals at the customer premises and thereby terminate the RFoG system at the subscriber-side interface. This is accomplished in place of the same function traditionally performed back at the higher-level serving area optical networking unit nodes in the RFoG network. The RF infrastructure remains in place; the difference is that the optic fiber termination is moved from an optical fiber node of the HFC network or ONU to gateways 225 at the customer premises.

Although RFoG systems provide a possible capacity increase relative to traditional HFC systems, an undesired effect of an RFoG system is the potential for upstream interference that may occur when more than one gateway 225 has the optical return path activated at any given time. For example, when amplitude modulation (AM) is used in the upstream path and optical upstream signals are received by the RFoG optical receiver at the headend corresponding to overlapping transmissions or bursts from multiple gateways or ONUs of about the same wavelength or of close or proximate wavelengths, optical interference, such as an optical collision or optical beating, may occur and cause optical beat interference (OBI). OBI is signal degradation in systems using amplitude modulation that occurs when two or more lasers with closely-spaced optical frequencies or wavelength transmit into optical fiber and mix together in the RFoG optical receiver causing splatter in the RF spectrum.

The impact of OBI is packet loss, i.e., the transmissions transmitted via the ONUs or gateways cannot be properly demodulated at headend 110. That is, optical beat interference (OBI) may occur in RFoG systems when two return transmitters transmit and the transmissions overlap while transmitting or hitting receiver simultaneously on a closely spaced wavelength. Closely spaced may be around 0-200 picometers, and potentially higher, depending on the exact modulation type (AM, FM, etc.). This may particularly be a problem if the bursts or transmissions contain voice packets. In systems that use frequency modulation (FM) in the upstream path, any overlap of transmissions in time from different ONUs or gateways may cause upstream interference, even if the transmit wavelengths are far apart.

User devices 220 that have upstream channel bonding capability are therefore able to simultaneously transmit in different RF channels. Thus, as described above, the resulting simultaneous use of multiple channels by different user devices 220 in an RFoG system and increased usage of networks further enhance a likelihood of OBI, upstream interference, and modulation errors. In a cable system, for example, the condition that causes OBI can easily occur in multiple-dwelling unit (MDU) applications of DOCSIS-based systems with bonded upstream channels. OBI can potentially impact the entire return path performance and will become an increasing concern as return path bandwidth and utilization grows. Also, this affects downstream (DS) throughput in TCP-based applications as ACK packets get affected in the upstream.

In one embodiment, an OBI manager 100 provides techniques for OBI reduction/elimination based on identifying the OBI partners within a gateway/user device population. Once OBI partners are identified, OBI manager 100 performs a mitigation solution then may reduce OBI by making sure that no OBI partners transmit at the same time slot in one embodiment. In one example, only one gateway 225 or user device 220 may transmit in a time slot to a specific receiver.

Leveraging the use of scheduling based OBI reduction/elimination, particular embodiments can have a gateway 225 transmit digital baseband data in the optical domain without modulation through RFoG network 215 to headend 110. In one embodiment, as discussed above, optical fiber may reach to gateway 225. In this case, an optical signal may be sent from gateway 225 through RFoG network 215 to headend 110. RF modulation may not be used because the bandwidth from gateway 225 to headend 110 is sufficient in the upstream direction due to optical fiber extending to gateway 225. That is, by providing fiber to gateway 225, bandwidth in the upstream direction is increased and modulation may not be needed. This simplifies the transmission and allows for the elimination of ONUs entities that are separate from gateways 225, which convert optical signals to electrical signals. The following will now describe the upstream and downstream paths in more detail.

Figure 2:
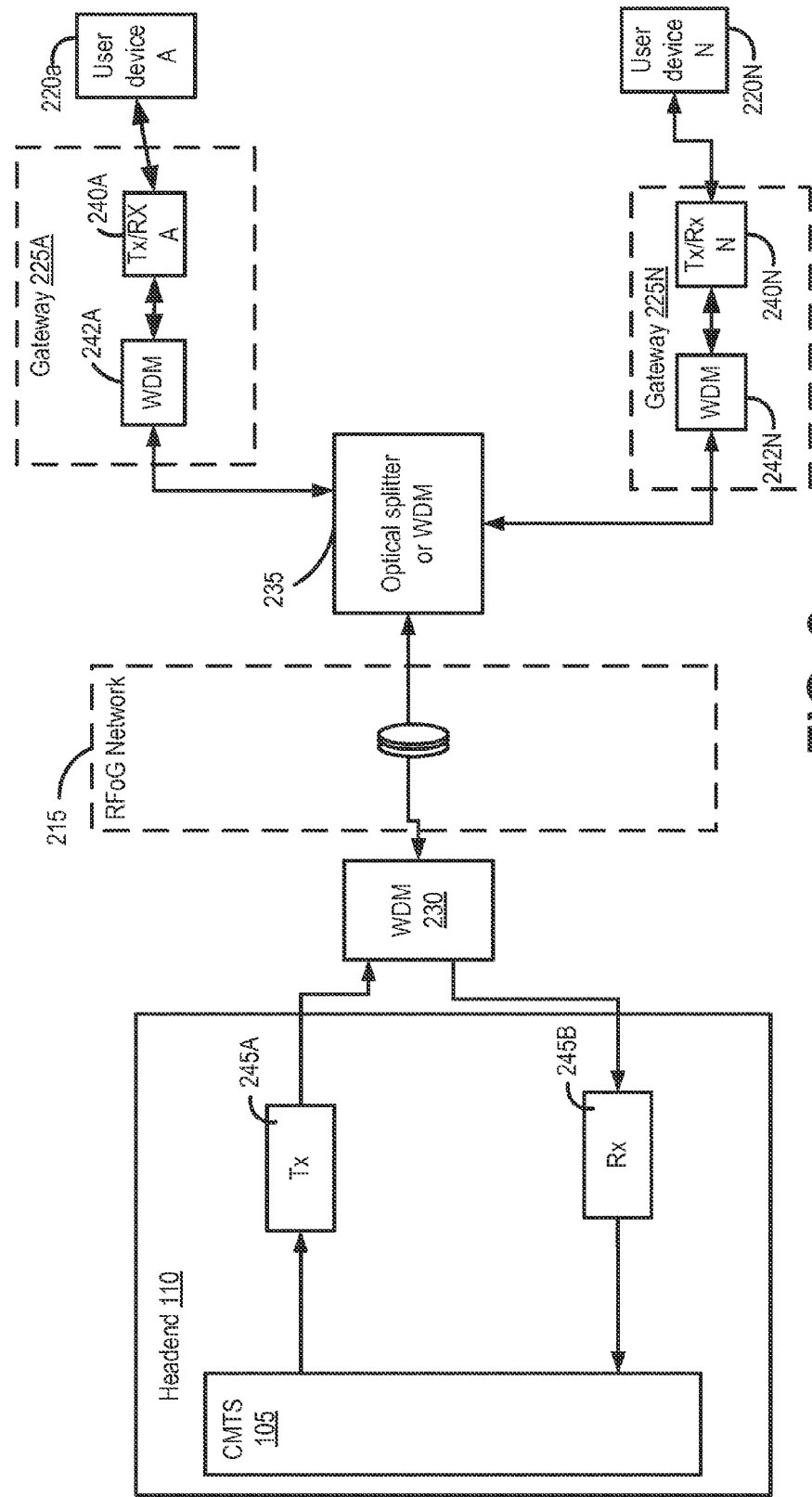
FIG. 2 depicts an example of the upstream and downstream paths in more detail according to one embodiment.

FIG. 2 depicts an example of the upstream and downstream paths in more detail according to one embodiment. Headend 110 includes a transmitter (Tx) 245A to transmit in the downstream direction and a receiver (Rx) 245B to receive data in the upstream direction. Also, a wavelength division multiplexing (WDM) device 230 multiplexes the upstream and downstream signals. The multiplexed signals are sent and received through optical fiber in RFoG network 215 from WDM 230 to one or more optical splitters 235 or WDMs. Hereinafter, this device will be referred to as optical splitter 235, but a multiplexer may be used. Optical splitter 235 may split the optical signal in the downstream or upstream direction to various user devices 220. For example, the signals may be sent via gateways 225A-225N to user devices (e.g., set-top boxes, or other CPEs) 220A-N. WDMs 242A-N may also be used to separate the downstream and upstream signals to/from transceivers (Tx/Rx) 240A-N.

Other implementations of WDMs 242 and transceivers 240 may be appreciated also. User devices 220 may also include multiple user devices. As discussed above gateways 225 and user devices 220 may be located in a premise.

Transceiver 240 may be an optics device, such as a small form-factor pluggable (SFP) optics device, or another optics devices, such as discrete optics devices. The interface between transceiver 240 and user device 220 can send/receive the digital baseband data to user device 220 via various communication protocols. The baseband digital signal can be sent by any means whether electrical, optical, wireless or other connection means and whether modulated or as a baseband signal. Some examples are Cat5/6, USB, MoCA, Ethernet, etc. Further, an RF interface may be used to send an RF signal directly to user device 220.

As discussed above, optical fiber may extend to gateways 225 in either the downstream, upstream, or both directions. Transceiver 240 may convert signals between the optical domain and the electrical domain in both the upstream and downstream directions. That is, communications between user device 220 and transceiver 240 may be in the electrical domain and communications between transceiver 240 and headend 110 may be in the optical domain. Although communications between user device 220 and transceiver 240 are discussed as being in the electrical domain, it will be understood that this connection may be in the optical domain and various interfaces may be used for this connection. Transceiver 240 performs the conversion from the optical domain to the electrical domain in the downstream direction and from the electrical domain to the optical domain in the upstream direction. When the connection is in the optical domain, this conversion is not necessary. In one embodiment, transceiver 240 is configured to not perform RF modulation in the upstream direction. However, transceiver 240 may perform baseband modulation, such as on off key (OOK) modulation. OOK may be a form of amplitude-shift keying (ASK) modulation that represents digital data as the presence or absence of a carrier wave. Transceiver 240 may or may not receive modulated data in the downstream direction.

Figure 3A:
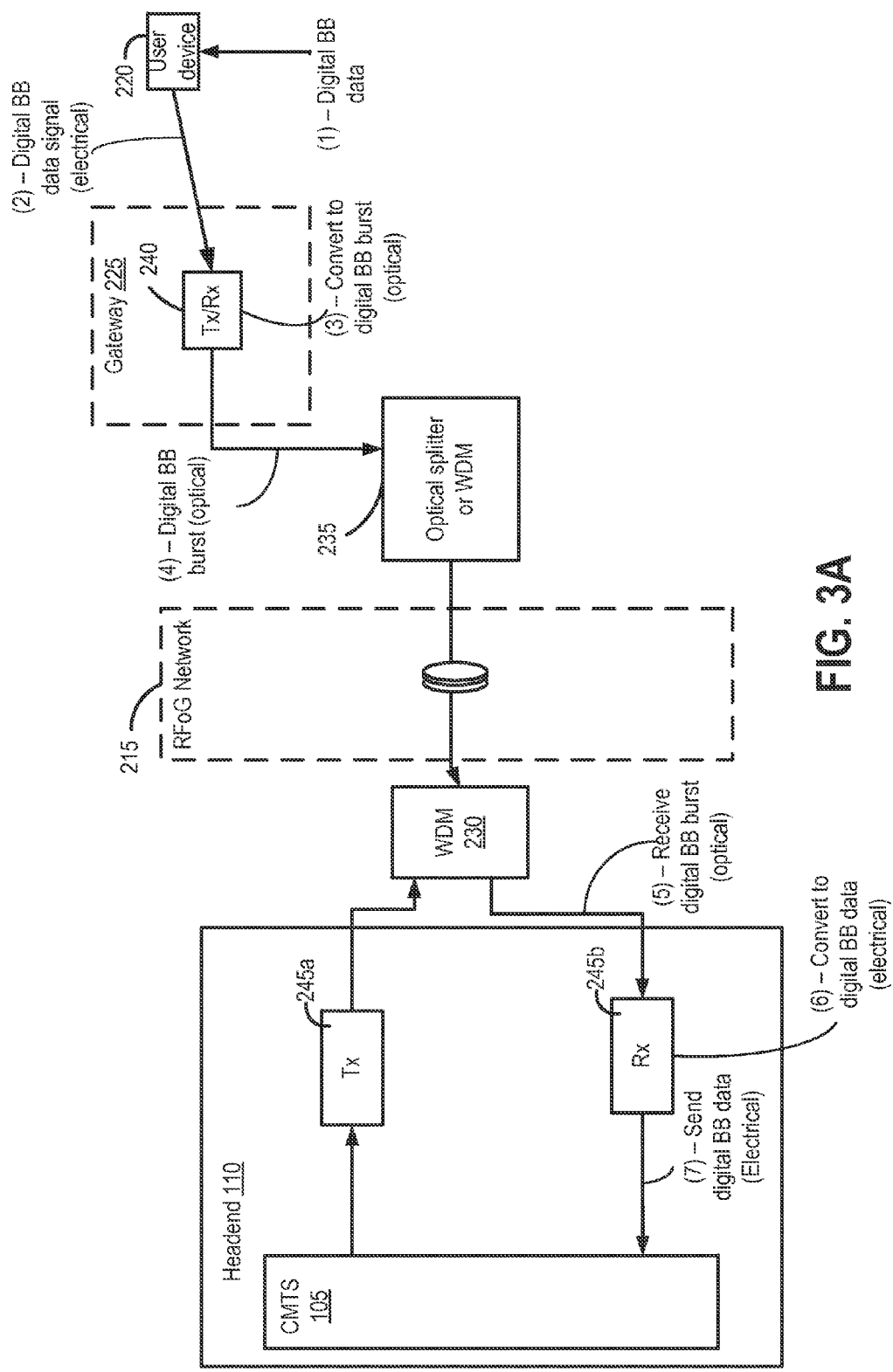
FIG. 3A depicts a more detailed example of the upstream path according to one embodiment.
Figure 3B:
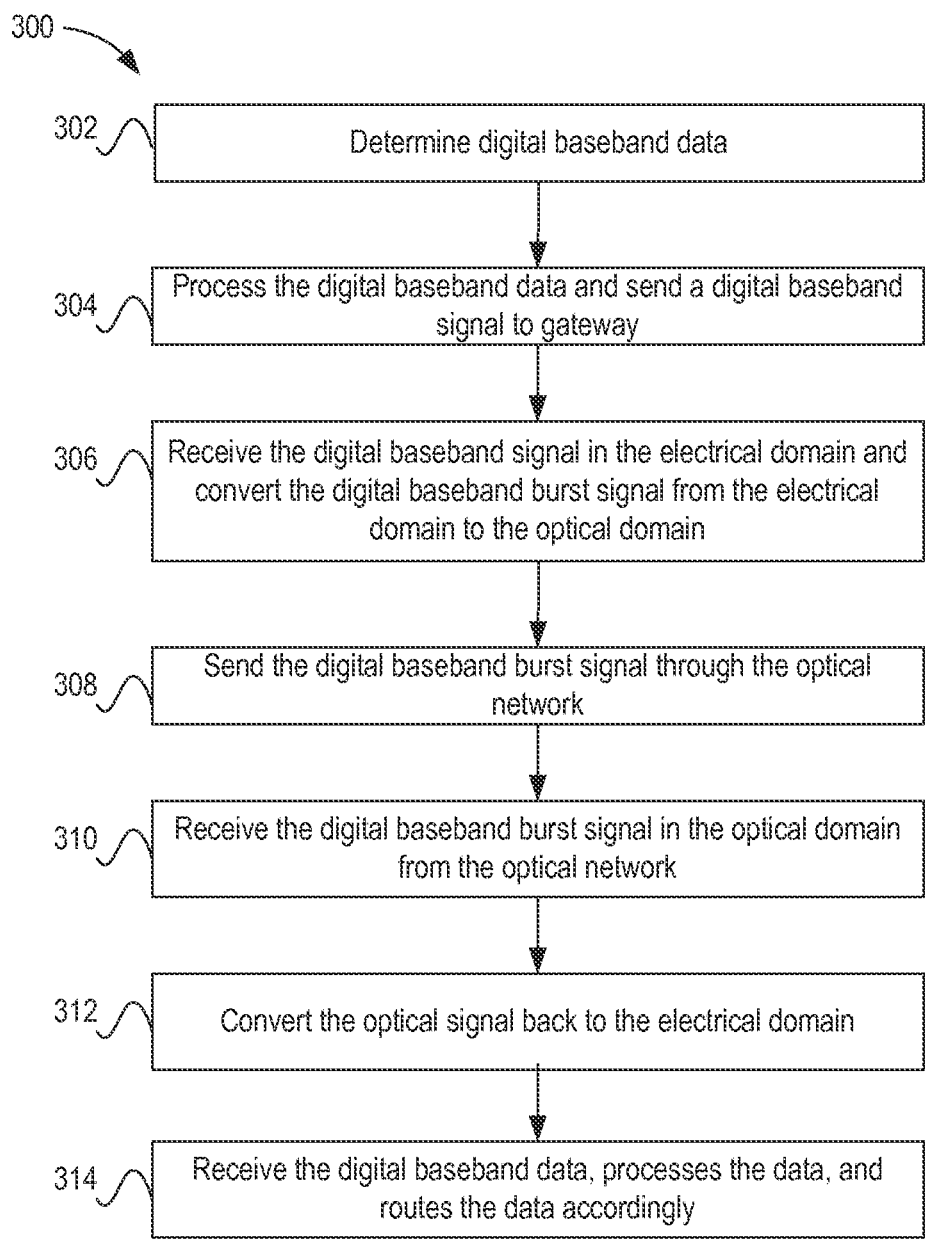
FIG. 3B depicts a flowchart for the upstream path shown in FIG. 3A.

As discussed above, particular embodiments do not RF modulate data sent in the upstream direction from transceiver 240 to receiver 245B. FIG. 3A depicts a more detailed example of the upstream path according to one embodiment. Also, FIG. 3A will be described with reference to a flowchart shown in FIG. 3B. At (1) in FIG. 3A, (Reference No. 302 in the flowchart shown in FIG. 3B), user device 220A determines digital baseband (BB) data. The digital baseband data may be received at user device 220 from various other devices or data sources, such as from CPE devices. In other embodiments, user device 220 generates the digital baseband data. User device 220 may then process the digital baseband data, such as by buffering the data until user device 220 is scheduled to transmit such that no OBI results. As is known in the art, digital baseband data is where digital (e.g., on/off) data is carried in a digital form at the baseband frequency. The baseband digital signal may include implementations of baseband digital return (BDR) and baseband compressed return (BCR), which are both based on baseband on/off digital signaling. Also, it will be understood that different methods of communicating the data between user device 220 and gateway 225 may be used, such as Ethernet, universal serial bus (USB), WiFi, etc. Further, digital baseband data can be sent via RF also.

The digital baseband signal from user device 220 is scheduled by CMTS 105 based on a scheduling algorithm to avoid OBI. For example, OBI manager 100 may schedule gateway 225/user device 220 such that no other user devices/gateways are transmitting in the same time slot that would interfere with the transmission from gateway 225/user device 220. This preserves the media access control (MAC) layer of scheduling transmissions to avoid OBI.

After determining or having been assigned by the CMTS a timeslot to transmit such that no OBI and no data collision will occur, at (2) (Reference No. 304), user device 220 processes the digital baseband data and sends a digital baseband signal to gateway 225. The digital baseband signal is sent in the electrical domain and may be a digital baseband burst signal. In other embodiments, user device 220 may not wait for a timeslot to send the data, but rather sends the digital baseband signal to gateway 225, which can store the signal until being scheduled to transmit by the gateway.

At (3) (Reference No. 306), transceiver 240 receives the digital baseband signal in the electrical domain and converts the digital baseband signal from the electrical domain to the optical domain. The conversion is performed such that the digital baseband burst signal can be sent through the optical network. That is, bursts of on/off data are sent via a laser in the optical domain. The optical signal remains digital baseband data in that the signal is sent using on/off bursts of the laser instead of being modulated in a carrier wave. Thus, transceiver 240 does not modulate the digital baseband burst signal using radio frequency. A form of baseband modulation may be used, however. The digital baseband data may be sent through WDM 242 (not shown), which separates the upstream and downstream paths in gateway 225. At (4) (Reference No. 308), gateway 225 sends the digital baseband burst signal through the optical network, such as through optical splitter 235, RFoG network 215, and WDM 230.

At (5) (Reference No. 310), receiver 245B in headend 110 (or CMTS 105) receives the digital baseband burst signal in the optical domain from the optical network (RFoG network 215). At (6) (Reference No. 312), receiver 245B may convert the optical signal back to the electrical domain. Or, in other embodiments, receiver 245B may not convert the optical signal. The signal remains in the digital baseband form, and receiver 245B does not need to demodulate the signal. Thus, due to the digital baseband data not being RF modulated, the digital baseband data at the physical layer does not need to be demodulated.

At (7) (Reference No. 314), CMTS 105 receives the digital baseband data, processes the data, and routes the data accordingly. For example, a receiver in CMTS 105 receives the digital baseband data and can process the data.

In the above flow in the upstream direction, the scheduling of transmissions of gateway 225 for the media access control (MAC) layer is performed to avoid simultaneous transmissions by multiple gateways 225 that may cause OBI or data collisions. However, the physical layer from user device 220 and/or gateway 225 in the upstream direction avoids the use of RF modulation from gateway 225. Also, at CMTS 105, the upstream de-modulation step for RF is eliminated in the physical layer, but the MAC layer and its functionality is preserved.

Figure 3C:
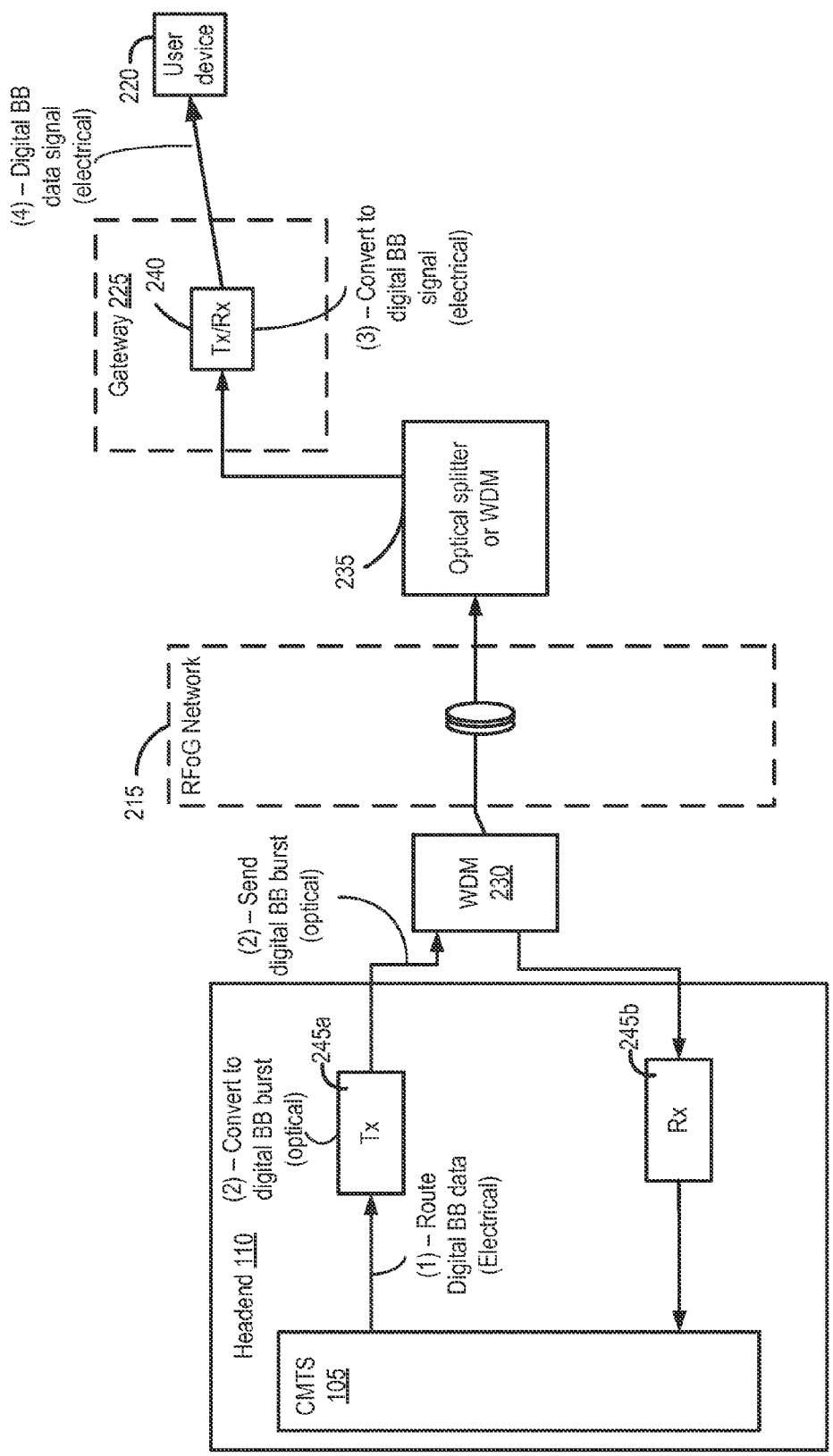
FIG. 3C depicts a more detailed example of the downstream path according to one embodiment.
Figure 3D:
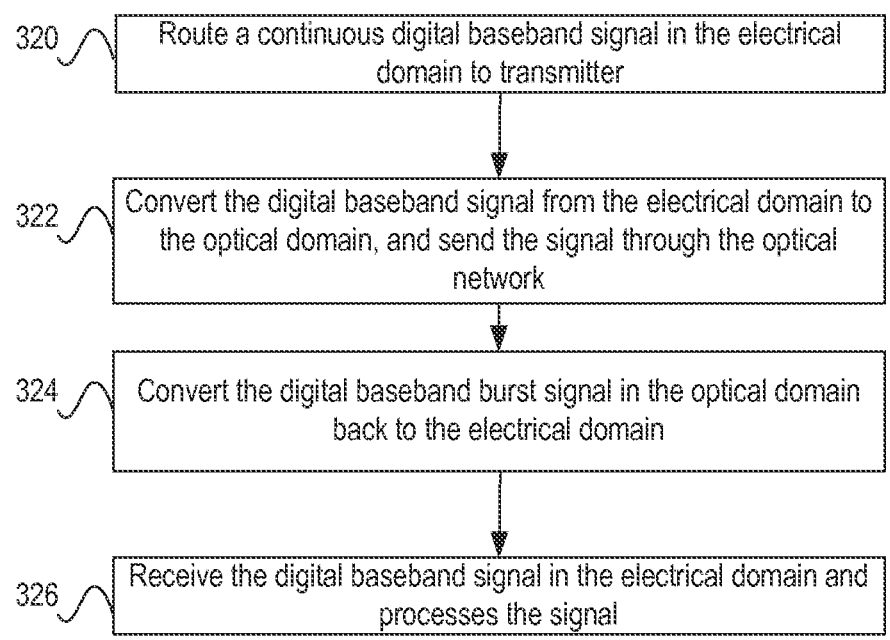
FIG. 3D depicts a flowchart for the downstream path shown in FIG. 3C.

In the downstream path, various approaches may be used. In one embodiment, the same network conventionally used to send downstream data may be used, which uses radio frequency modulation. This embodiment will be described in more detail below in FIG. 4A. The following embodiment provides the processing of digital baseband data without RF modulation in gateway 225 in the downstream direction. FIG. 3C depicts a more detailed example of the downstream path according to one embodiment. In FIG. 3C, the downstream path is described using the same components as discussed above with respect to the upstream path. Also, FIG. 3C will be described with reference to a flowchart shown in FIG. 3D.

At (1) in FIG. 3C (Reference No. 320 in the flowchart in FIG. 3D), CMTS 105 routes a continuous digital baseband signal in the electrical domain to transmitter 245A. In other embodiments, CMTS 105 routes an optical signal in the optical domain to transmitter 245A. Transmitter 245A may be located on a separate card from receiver 245B as described above. Or, in one embodiment, transmitter 245A may be an optics device that could be a duplex or bi-directional and be both a transmitter and receiver and either or both functionalities could be integrated into the CMTS 105.

At (2) (Reference No. 322), transmitter 245A converts the digital baseband signal from the electrical domain to the optical domain, and sends the signal through the optical network. For example, transmitter 245A may transmit a digital baseband burst signal. In this case, no RF modulation is performed in the downstream path, but digital baseband modulation may be performed. Also, in the downstream direction, the digital baseband signal is sent through WDM 230, RFoG network 215, and optical splitter 235. When the digital baseband signal is received, optical splitter 235 routes the optical signal to WDM 242 (not shown) in gateway 225, which can separate any upstream and downstream signals. Also, as discussed above, optical splitter 235 may route the downstream signal to any other gateways/user devices 225 that request the signal. It is noted that in this embodiment, the optical signal is routed to gateway 225 instead of being terminated at an ONU in the network. That is, optical fiber extends to gateway 225, which may be located at the premises of user device 225. In other embodiments, the functionality of the gateway may be located in other devices.

At (3) (Reference No 324), transceiver 240 converts the digital baseband burst signal in the optical domain back to the electrical domain. The conversion from the optical domain to the electrical domain occurs at the premises that includes user device 220. Transceiver 240 can then send the digital baseband signal in the electrical domain to user device 220. The digital baseband data may be sent to user device 220 using various methods as described above.

At (4) (Reference No. 326), user device 220 receives the digital baseband signal in the electrical domain and processes the signal. For example, the signal may be output to a user. Also, scheduler information from CMTS 105 may be included in the signal and used for upstream control of sending the digital baseband signal back through the upstream path.

Figure 4A:
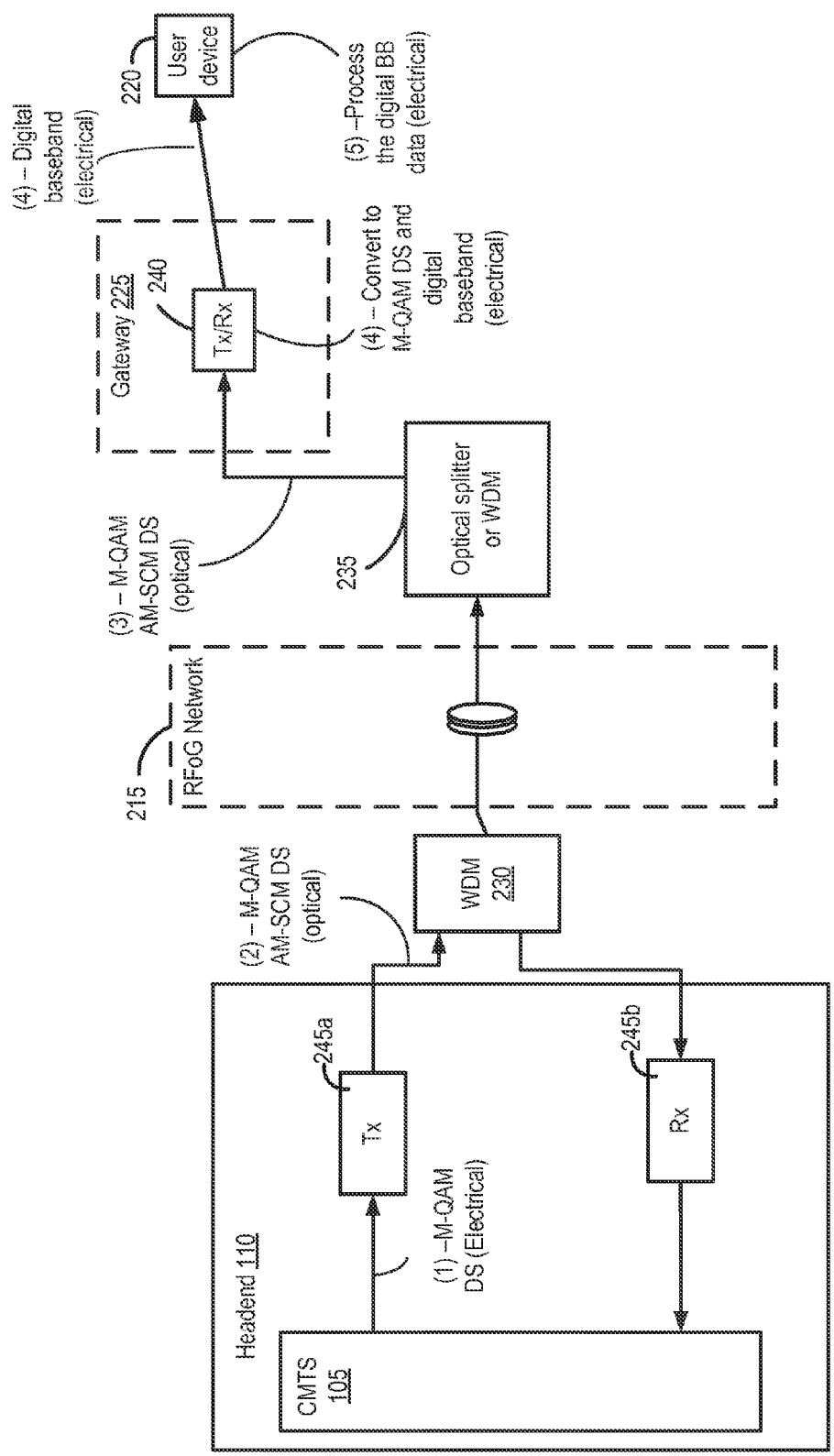
FIG. 4A shows an example of the downstream path using modulation according to one embodiment.
Figure 4B:
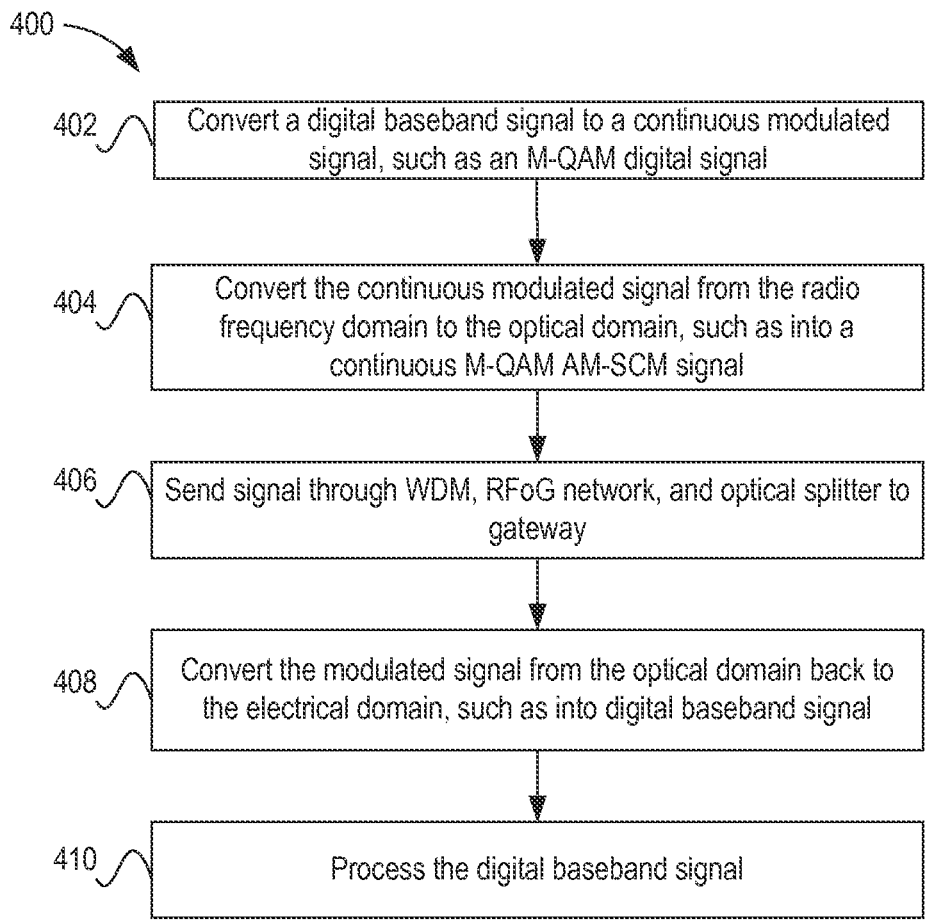
FIG. 4B depicts a flowchart for the downstream path shown in FIG. 4A.

As discussed above, in the downstream path, RF modulation may be used. FIG. 4A shows an example of the downstream path using RF modulation according to one embodiment. Also, FIG. 4A will be described with reference to a flowchart 400 shown in FIG. 4B.

At (1) in FIG. 4A (Reference No. 402 in flowchart 400 of FIG. 4B), CMTS 105 converts a digital baseband signal to a continuous or burst modulated signal, such as an M-quadrature amplitude modulation (QAM) downstream signal (DS) (or OFDM signal). CMTS 105 sends the continuous modulated or burst modulated signal to transmitter 245A. At (2) (Reference No. 404), transmitter 245A converts the continuous modulated or burst modulated signal from the radio frequency domain to the optical domain, such as into a continuous or burst modulated M-QAM amplitude modulation (AM)-sub-carrier multiplex (SCM) signal or Orthogonal frequency-division multiplexing (OFDM) signal. Although M-QAM or OFDM is discussed, particular embodiments are not limited to this type of modulation and other modulation schemes may be used. The continuous modulated signal may be an RF modulated optical signal. At (3) (Reference No. 406), the signal is sent through WDM 230, RFoG network 215, and optical splitter 235 to gateway 225. WDM 242 (not shown) separates the downstream signal from the upstream signals, and sends the downstream signal to transceiver 240.

For sending the downstream signal from gateway 225 to user device 220, various options may be used, such as sending an RF modulated signal or demodulating the signal to send digital baseband. In this case digital baseband is used, and at (4) (Reference No. 408), transceiver 240 demodulates the RF modulated signal and converts the signal from the optical domain back to the electrical domain. For example, transceiver 240 converts the signal to a continuous M-QAM signal (or OFDM signal) in the electrical domain and then demodulates the signal to digital baseband. Transceiver 240 then sends the digital baseband signal to user device 220. In this case, transceiver 240 is performing the RF demodulation function and conversion to a digital baseband signal in gateway 225. That is, the optical signal is converted to the electrical domain in gateway 225. Also, in other embodiments, a device other than transceiver 240 may be used to convert the signal from the optical domain to the RF domain, such as an ONU. For example, the ONU functionality may be moved from gateway 225 to an ONU (not shown) and may be found within RFoG network 215. In this case, gateway 225 may be removed and replaced with a cable modem. Also, the network from the ONU to the cable modem may be an RF network, and not an optical network.

At (5) (Reference No. 410), user device 220 processes the digital baseband signal in the electrical domain. In other embodiments, user device 220 may receive an optical signal, or a modulated RF signal.

The above downstream path described in FIG. 4A may be used in combination with the upstream path described in FIG. 3A. In this case, the downstream path remains RF modulated, but the upstream path is not RF modulated. The ability of gateway 225 to de-alienate/demark the upstream and downstream paths allows the use of different techniques in sending upstream and downstream data.

Figure 4C:
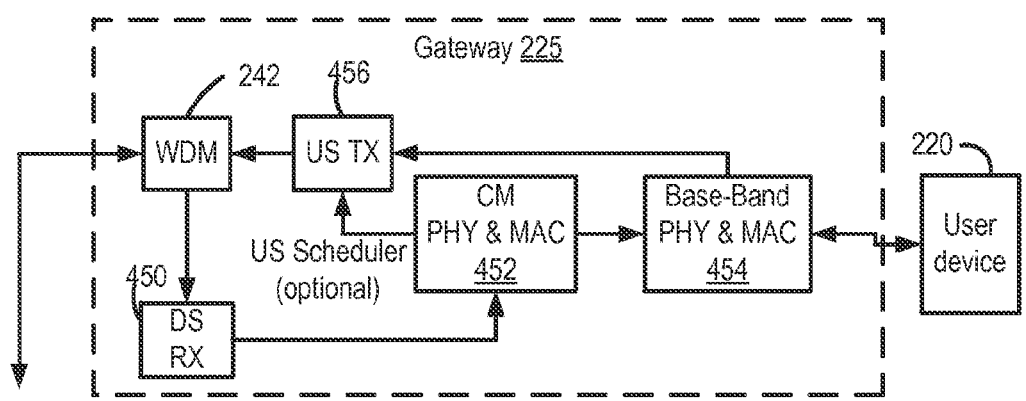
FIG. 4C depicts a more detailed example of a gateway according to one embodiment.

FIG. 4C depicts a more detailed example of gateway 225 according to one embodiment. In gateway 225, the physical layer for the upstream path has been changed such that RF modulation is not used. However, the downstream remains the same in that RF modulation is used. Further, the MAC layer in both the upstream and the downstream directions retains scheduling of user devices to avoid OBI. The functionalities of components in gateway 225 could be performed in any form, whether hardware or software, and could be partitioned into physical or virtual systems or "chips" with any implementable demarcation.

In gateway 225, WDM 242 receives a downstream signal and forwards the downstream signal to DS receiver (Rx) 250. DS Rx 250 converts the downstream signal from the optical domain to the electrical domain, such as from a continuous m-QAM AM/SCM signal to a continuous M-QAM signal. OFDM may also be used instead of m-QAM. Rx 250 may then forward the downstream signal to a cable modem physical and MAC chipset (CM PHY & MAC) 452. CM PHY & MAC 452 may demodulate the RF modulated downstream signal into digital baseband data. CM PHY & MAC 452 then passes the digital baseband downstream signal to a baseband PHY & MAC chipset 454, which processes the downstream signal. For example, baseband PHY & MAC chipset 454 can send the digital baseband data to user device 220 via various communication protocols. For example, Ethernet, USB, etc. may be used. Further, instead of using base-band PHY & MAC chipset 454, an RF interface (not shown) directly from Rx 450 may be used to send an RF signal directly to user device without RF demodulation.

In an optional embodiment, CM PHY & MAC 452 may use the downstream signal to determine upstream scheduling information. This schedules upstream transmitter (US Tx) 456.

In the upstream direction, user device 220 sends digital baseband data to baseband PHY & MAC chipset 454. The digital baseband data may be sent using various interfaces/ protocols. Base-band PHY & MAC chipset 454 may process the digital baseband data, and send the upstream signal to Tx 456 without passing through CM PHY & MAC 452. This allows a baseband signal to be sent through network 215 without the need to modulate the signal. Tx 456 converts the digital baseband data from the electrical domain to the optical domain. Then, the optical signal is sent through WDM 242. Other methods of sending the upstream signal may also be appreciated. For example, user device 220 may send RF signals to the RF interface, and then gateway 225 demodulates the RF signal, and sends the demodulated signal to base-band PHY & MAC chipset 454. Other methods may also be used.

In gateway 225, the physical layer in the upstream does not use RF modulation and may bypass CM PHY & MAC 452. However, in the downstream, RF modulation is used and thus is passed through CM PHY & MAC 452 before being sent to baseband PHY & MAC chipset 454.

Figure 5:
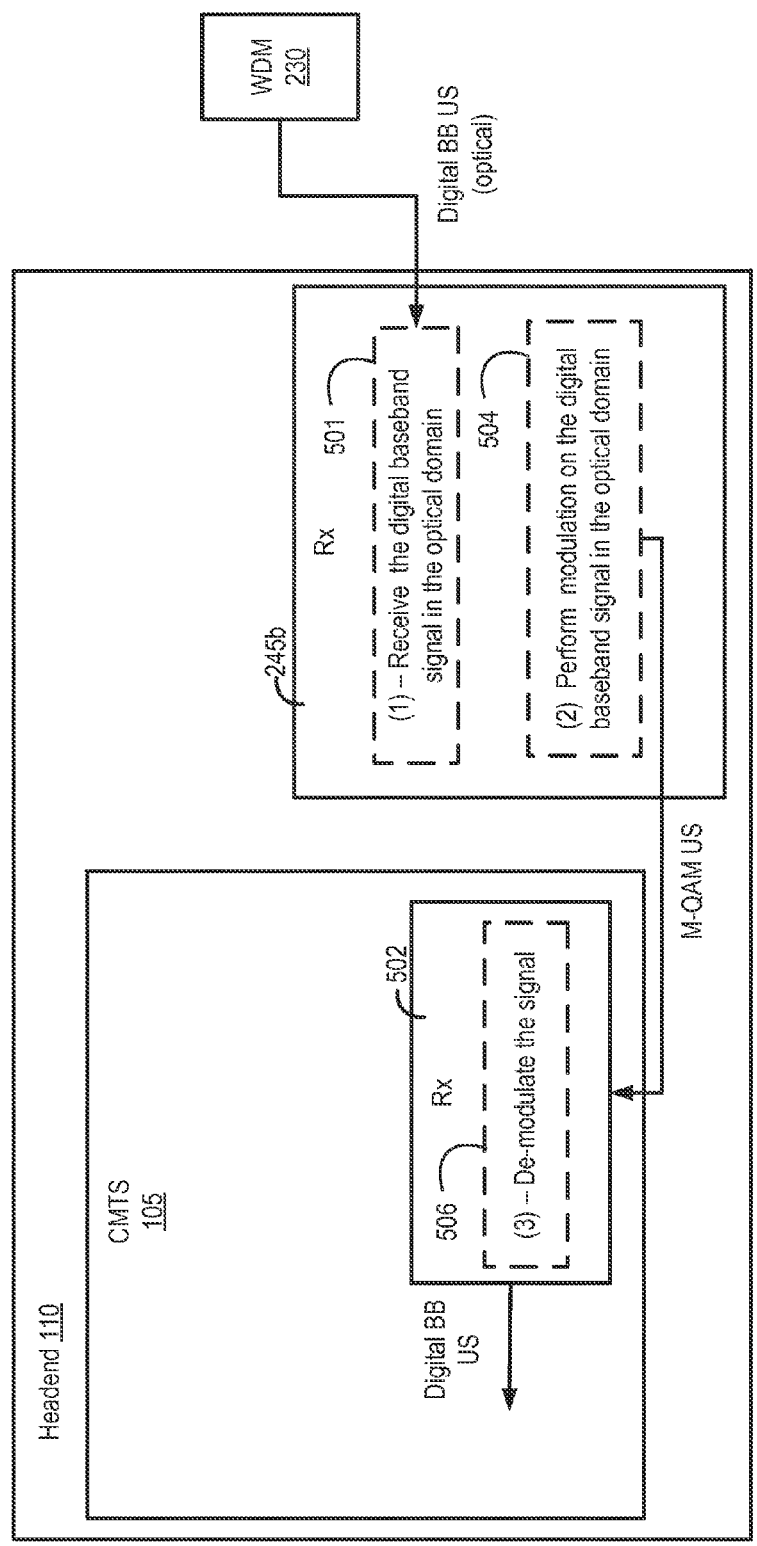
FIG. 5 depicts a more detailed example of headend according to one embodiment.

In one embodiment, some parts of the system may still need to receive signals that are modulated in the upstream path. For example, a receiver in headend 110 may not be configured to receive a digital baseband signal without RF modulation. In this case, an upstream optical receiver may be used to receive the upstream optical signal, modulate the signal via RF, which converts it to a format expected by CMTS 105. FIG. 5 depicts a more detailed example of headend 110 according to one embodiment. At (1) (Reference No. 501), receiver 245B receives the digital baseband signal in the optical domain. This is the same digital baseband signal received by receiver 245B as described above in FIG. 3A. However, in some cases, CMTS 105 may not be able to directly receive the digital baseband signal without RF modulation. That is, a receiver in CMTS 105 may not have been changed to receive digital baseband data that is not RF modulated. Thus, at (2) (Reference No. 504), receiver 245B performs RF modulation on the digital baseband signal. For example, receiver 245B may modulate the signal, such as into a burst M-QAM digital signal. OFDM may also be used. This may be an RF modulated signal that CMTS 105 expects to receive. Receiver 245B then sends the RF modulated signal to CMTS 105 via any interface.

A receiver 502 in CMTS 105 receives the RF modulated signal. At (3) (Reference No. 506), receiver 502 de-modulates the RF signal. Although modulation is performed in this embodiment, the modulation is only performed within headend 110 and a modulated signal is not sent through RFoG network 215.

Figure 6:
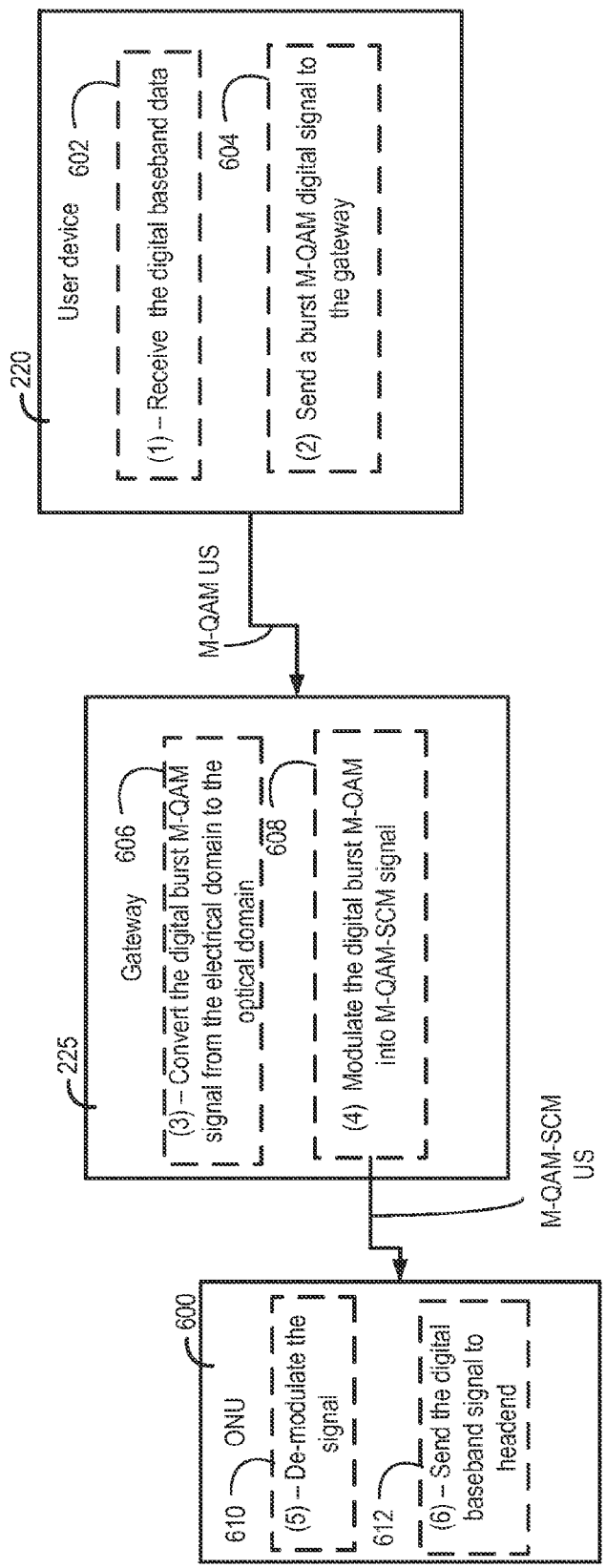
FIG. 6 depicts a more detailed example of the upstream path where modulation is performed at a gateway according to one embodiment.

In one embodiment, the upstream path may not be able to transmit in the optical domain from gateway 225 to headend 110. For example, a coaxial cable link may exist from gateway 225 to an ONU found in RFoG network 215. In this case, gateway 225 may RF modulate the digital baseband signal, but ONU demodulates the RF signal and sends the digital baseband signal through RFoG network 215 without RF modulation. FIG. 6 depicts a more detailed example of the upstream path where modulation is performed at gateway 225 according to one embodiment. At (1), (Reference No. 602), user device 220A receives digital baseband data. At (2) (Reference No. 604), user device 220A sends a burst M-QAM upstream signal to gateway 225 in the electrical domain.

At (3) (Reference No. 606), gateway 225 converts the digital burst M-QAM upstream signal from the electrical domain to the optical domain. At (4) (Reference No. 608), gateway 225 RF modulates the digital burst M-QAM upstream signal, such as into a burst M-QAM amplitude modulation (AM)-subcarrier multiplex (SCM) upstream signal, and sends the RF modulated signal through the optical network.

Instead of sending the RF modulated signal through RFoG network 215 to headend 110, at (5) (Reference No. 610), an ONU 600 demodulates the modulated signal into a digital baseband signal in the optical domain. Then, at (6) (Reference No. 612), ONU 600 sends the digital baseband signal to headend 110 in the optical domain without RF modulation. In this case, the signal may be RF modulated from gateway 225 to ONU 600, but not from ONU 600 to headend 110. The system in FIG. 6 may be combined with the system in FIG. 5 if headend 110 is not configured to receive signals without RF modulation.

Accordingly, particular embodiments use the scheduler-based method for eliminating OBI where gateways 225 transmit without RF modulation through the optical network. A single user device 220 that is not an OBI partner with another user device may transmit at a single timeslot. Gateway 225 does not modulate the signal via RF, but rather transmits the digital baseband signal through the optical network. Headend 110 thus does not need to perform a de-modulation step.

Also, particular embodiments incorporate the optical-to-electrical (e.g., RF) conversion in gateway 225 instead of providing that function in an ONU. This leverages the optical fiber being coupled to gateway 225, or the premise in which a user device 220 resides. Any interface between user devices 220 and gateways 225 may be used. In some cases, RF modulation may be avoided between user device 220 and gateways 225, and also gateways 225 and headend 110.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for using baseband communication in an upstream path and avoiding optical beat interference in the upstream path, the method comprising:
receiving and transmitting signals in the upstream path and in a downstream path at a fiber terminating device that includes a cable modem media access control (MAC) layer and a baseband media access control (MAC) layer, wherein the fiber terminating device is associated with at least one user device;
in a downstream direction at the fiber terminating device:
receiving downstream optical signals;
converting the downstream optical signals from an optical domain to an electrical domain;
forwarding the downstream electrical signals to the cable modem MAC layer for generating a corresponding digital baseband downstream signal;
forwarding the digital baseband downstream signal to the baseband MAC layer for transmission to the associated user device;
in an upstream direction at said fiber terminating device:
receiving upstream digital baseband signals at the baseband MAC layer;
bypassing the cable modem MAC layer processing in said fiber terminating device;
converting the digital baseband signals from the electrical domain to the optical domain for transmission in the upstream path;
avoiding optical beat interference in transmissions in the upstream path by maintaining each optical digital baseband signal in a native baseband on/off digital domain for digital transmission via on/off bursts without radio frequency (RF) modulation in an upstream direction towards a headend device,
wherein a scheduling of transmissions for the baseband MAC layer of the on/off digital baseband signals in the upstream direction is performed to avoid simultaneous transmissions with optical beat interference (OBI) partners, using separate time slots to prevent interference with another transmission in the upstream direction.

2. The method of claim 1, further comprising:
receiving a radio frequency signal modulated at the headend device in a downstream direction towards the user device;
demodulating the radio frequency modulated signal into a demodulated digital baseband signal; and
sending the demodulated digital baseband signal to the user device.

3. The method of claim 1, further comprising:
receiving a radio frequency signal modulated at headend device in a downstream direction towards the user device;
converting the radio frequency modulated signal into a radio frequency signal; and
sending the radio frequency signal to the user device.

4. The method of claim 1, wherein the digital baseband signals received from the user device is based on a radio frequency modulated signal, the method further comprising:
demodulating the radio frequency modulated signal into the digital baseband signal; and sending the digital baseband signals towards the headend device.

5. The method of claim 1, wherein the digital baseband signals comprise a first digital baseband signal, the method further comprising:
receiving a second digital baseband signal from the headend device in the downstream direction towards the user device from an optical network, wherein the second digital baseband signal is not modulated via radio frequency; and
sending the second digital baseband signal to the user device.

6. The method of claim 1, wherein an optical network extends fiber to a computing device, wherein the computing device is included in a premise including the user device.

7. The method of claim 1, wherein:
receiving comprises receiving digital baseband signals in the electrical domain, and
transmitting the digital baseband signal converted to the optical domain over an optical network towards the headend device.

8. The method of claim 7, wherein the headend device receives the corresponding digital baseband signal in the optical domain and converts the digital baseband signal in the optical domain to the digital baseband signal in the electrical domain.

9. The method of claim 1, wherein the headend device modulates a digital baseband signal within the headend device upon receipt and provides the modulated digital baseband signal to a demodulator to demodulate the modulated digital baseband signal.

10. The method of claim 1, wherein an optical networking unit (ONU) separate from a computing device is not used to convert a digital baseband signal from the user device to the optical domain.

11. The method of claim 1, wherein a computing device separates a downstream direction and the upstream direction.

12. The method of claim 1, wherein an optical network through which the fiber terminating device transmits the digital baseband signals in the optical domain comprises a radio frequency over glass (RFoG) network.

13. An apparatus comprising:
one or more computer processors; and
a non-transitory computer-readable storage medium comprising instructions that, when executed, control the one or more computer processors to be configured for:
receiving and transmitting signals in an upstream path and a downstream path at a fiber terminating device that includes a cable modem media access control (MAC) layer and a baseband media access control (MAC) layer, wherein the fiber terminating device is associated with at least one user device;
in a downstream direction at the fiber terminating device;
receiving downstream optical signals;
converting the downstream optical signals from an optical domain to an electrical domain;
forwarding the downstream electrical signals to the cable modem MAC layer for generating a corresponding digital baseband downstream signal;
forwarding the digital baseband downstream signal to the baseband MAC layer for transmission to the associated user device;
in an upstream direction at said fiber terminating device:
receiving an upstream digital baseband signals at the baseband MAC layer, bypassing the cable modem MAC layer processing in said fiber terminating device;
converting the digital baseband signals from the electrical domain to the optical domain for transmission in the upstream path;
avoiding optical beat interference in the transmissions in the upstream path by maintaining each optical digital baseband signal in a native baseband on/off digital domain for digital transmission via on/off bursts without radio frequency (RF) modulation in an upstream direction towards a headend device,
sending the digital baseband signal through an optical network over fiber towards the headend device without modulating the digital baseband signal via radio frequency, wherein a scheduling of transmissions for the baseband MAC layer of the on/off digital baseband signals in the upstream direction is performed to avoid simultaneous transmissions with optical beat interference (OBI) partners, using separate time slots to prevent interference with another transmission in the upstream direction.

14. The apparatus of claim 13, further configured for:
receiving a radio frequency signal modulated at the headend device in a downstream direction towards the user device;
demodulating the radio frequency modulated signal into a demodulated digital baseband signal; and
sending the demodulated digital baseband signal to the user device.

15. The apparatus of claim 13, wherein the digital baseband signals received from the user device is based on a radio frequency modulated signal, the apparatus further configured for:
demodulating the radio frequency modulated signal into the digital baseband signal; and
sending the digital baseband signals towards the headend device.

16. The apparatus of claim 13, wherein the digital baseband signals comprise a first digital baseband signal, the method further comprising:
receiving a second digital baseband signal from the headend device in the downstream direction towards the user device from an optical network, wherein the second digital baseband signal is not modulated via radio frequency; and
sending the second digital baseband signal to the user device.

17. The apparatus of claim 13, wherein:
receiving comprises receiving digital baseband signals in the electrical domain, and
the method further comprising transmitting the digital baseband signal converted to the optical domain over an optical network towards the headend device.

18. The apparatus of claim 13, wherein an optical network through which the fiber terminating device transmits the digital baseband signals in the optical domain comprises a radio frequency over glass (RFoG) network.

* * * * *